(12) United States Patent
Cheung et al.

(10) Patent No.: US 9,082,107 B2
(45) Date of Patent: Jul. 14, 2015

(54) INTELLECTUAL ASSET AUTOMATIC DOCKETING AND FILE ASSOCIATION

(75) Inventors: Denise Cheung, Wellesley, MA (US); Kelly Crawford, Newcastle, WY (US); Erik Bailey, Needham, MA (US); David Bartle, Acton, MA (US)

(73) Assignee: ANAQUA, INC., Boston, MA (US)

( * ) Notice: Subject to any disclaimer, the term of this patent is extended or adjusted under 35 U.S.C. 154(b) by 417 days.

(21) Appl. No.: 13/280,219

(22) Filed: Oct. 24, 2011

(65) Prior Publication Data

US 2012/0173523 A1    Jul. 5, 2012

Related U.S. Application Data

(60) Provisional application No. 61/428,526, filed on Dec. 30, 2010, provisional application No. 61/476,567, filed on Apr. 18, 2011, provisional application No. 61/452,382, filed on Mar. 14, 2011.

(51) Int. Cl.
*G06F 7/00* (2006.01)
*G06F 17/30* (2006.01)
*G06Q 10/10* (2012.01)
*G06Q 50/18* (2012.01)

(52) U.S. Cl.
CPC ............ *G06Q 10/10* (2013.01); *G06Q 50/18* (2013.01)

(58) Field of Classification Search
USPC ............... 707/608, 923, 924, 925, 928, 929, 707/E17.008, 999.107
See application file for complete search history.

(56) References Cited

U.S. PATENT DOCUMENTS

| | | | |
|---|---|---|---|
| 8,468,118 B2* | 6/2013 | Kim et al. | 707/602 |
| 2002/0059076 A1* | 5/2002 | Grainger et al. | 705/1 |
| 2006/0218188 A1* | 9/2006 | Duncan et al. | 707/104.1 |
| 2007/0299806 A1* | 12/2007 | Bardsley et al. | 707/1 |
| 2010/0049769 A1* | 2/2010 | Chen et al. | 707/749 |

* cited by examiner

*Primary Examiner* — Uyen Le
(74) *Attorney, Agent, or Firm* — Maschoff Brennan

(57) ABSTRACT

One embodiment of the invention includes a method of associating a file with an intellectual asset record. The method includes reading information such as the file name and metadata pertaining to a file. The file name has a predetermined format made up of fields. The fields in the file name and the metadata are extracted. Based upon the fields, the file is linked to intellectual asset record. The intellectual asset record includes a set of related data organized into meaningful units pertaining to an intellectual asset.

22 Claims, 13 Drawing Sheets

| Tasks | | |
|---|---|---|
| Due Date | Target | Task Name |
| 08 Dec 2010 | John Smith | Application – Instruct Outside Counsel |
| 08 Mar 2011 | Jane Doe | Info Disclosure Statement Approaching |
| 08 Dec 2011 | John Smith | Application – Final Deadline to Foreign File |

*Fig. 4A*

INTELLECTUAL ASSET AUTOMATIC DOCKETING AND FILE ASSOCIATION

CROSS-REFERENCE TO RELATED APPLICATIONS

This application claims the benefit of and priority to U.S. Provisional Application No. 61/428,526 filed on Dec. 30, 2010, entitled "Intellectual Asset Automatic Docketing and File Association"; U.S. Provisional Application No. 61/476,567, filed on Apr. 18, 2011, entitled "Method and server for Improved Intellectual Asset Docketing"; and U.S. Provisional Application No. 61/452,382, filed on Mar. 14, 2011, entitled "Method and Server for Related Art Citation Management". The disclosures of all three provisional applications are incorporated herein by reference.

BACKGROUND

1. The Field of the Invention

Embodiments relate generally to intellectual asset docketing and management and more particularly to a method and system for intellectual asset automatic docketing and file association.

2. The Relevant Technology

A docketing system is used to schedule legal matters and manage aspects of intellectual property assets. Examples of intellectual property assets may include: patents, trade secrets, publications, trademarks, domain names, copyrights, and applications or filings thereof. An intellectual asset management system typically supports docketing and other related activities in the full lifecycle of intellectual property assets, such as invention disclosure submission, trademark search requests, multi-party collaboration, document and e-mail management, configurable business workflow rules, and business intelligence tools, among other features. An intellectual asset management system provides visibility and access to internal and external participants in the intellectual asset management process—for example, attorneys, agents and paralegals, researchers and engineers, portfolio managers, marketing, licensing professionals and other business managers.

A challenge facing docketing users of intellectual asset management systems is the association of documentation with intellectual property assets within the docketing systems. It is possible for one intellectual property asset to have hundreds, if not thousands, of associated documentation files. For example, drafting, filing, and prosecuting a patent application can generate numerous associated documents, such as the original invention disclosure, patent application drafts, drawings, ancillary patent filing documents, and patent prosecution office actions and responses. To store and associate all these various documents with an intellectual property asset within a docketing or intellectual asset management system can be a time-consuming and error-prone process.

Additional challenges for users of docketing and intellectual asset management systems are assigning appropriate tasks and recording prosecution items for docketing. For example, during patent application prosecution, it is generally important for a patent applicant or its legal representation to keep up-to-date on the status of the prosecution with a patent office, and to provide appropriate documentation and office action responses in a timely manner. A docketing solution can provide, among other things, recordation of this prosecution and the associated tasks assigned to the applicant or assigned agent(s) managing the prosecution so as to properly schedule actions that need to be taken, thereby helping to avoid paying late fees and losing rights to protect use of the associated invention.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Embodiments relate generally to intellectual asset docketing and management and more particularly to a method and system for intellectual asset automatic docketing and file association.

One embodiment of the invention includes a method of associating a file with an intellectual asset record. The method includes reading information such as the file name and metadata pertaining to a file. The file name has a predetermined format made up of fields. The fields in the file name and the metadata are extracted. Based upon the fields, the file is linked to an intellectual asset record. The intellectual asset record includes a set of related data organized into meaningful units pertaining to an intellectual asset.

Another embodiment includes a method of associating a file with an intellectual asset record. The intellectual asset record includes a set of related data organized into meaningful units pertaining to an intellectual asset. The steps of the method include reading information pertaining to a file such as metadata and a file name having a predetermined format. The format of the filename includes a reference identifier, a document date, and a document code reference. Additionally, the filename and the metadata are extracted. Based upon a correspondency between a record identifier and the reference identifier, the file is linked to the intellectual asset record. The record identifier is one meaningful unit of the set of related data organized into meaningful units and is an identifier uniquely identifying the intellectual asset record. Additionally, the document date is stored in the intellectual asset record as a document date value.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4A illustrates an example user interface object providing details on tasks associated with an intellectual asset record;

DETAILED DESCRIPTION OF SOME EXAMPLE EMBODIMENTS

Example embodiments of the invention relate to intellectual asset docketing and management. More particularly, example embodiments relate to a method and docketing system for intellectual asset automatic docketing and file association. The example systems disclosed herein can enable the file association and automatic docketing with an intellectual asset record based on information pertaining to the file such as a file name or metadata. In an example embodiment, a file name of a file may have a predetermined format including fields. The fields may be a reference identifier, which allows the system to associate the file with the intellectual asset record; a document date, which is stored as the document date value of the intellectual asset record; and a document code reference, which can be matched to templates used to create tasks and prosecution items in the intellectual asset record.

Figure 1:
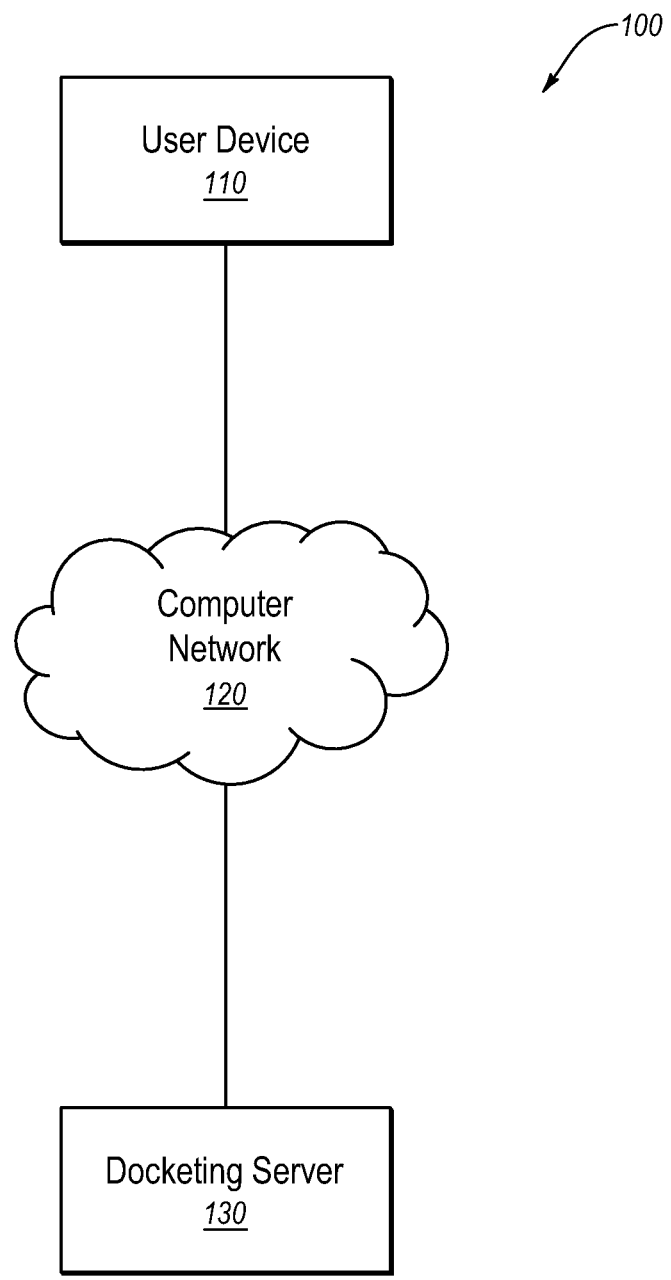
FIG. 1 illustrates an example docketing system including a docketing server.

FIG. 1 illustrates an example docketing system 100. The docketing system 100 may include a user device 110, a computer network 120, and a docketing server 130. The user device 110 is operably connected to allow a docketing user (not shown) access to a docketing service (not shown) through communication via the computer network 120 with the docketing server 130.

The docketing service generally schedules legal matters and manages aspects of those legal matters. For example, an intellectual property docking service may support scheduling a disclosure submission and manage the related filing dates such as provisional application filing, non-provisional conversion dates, maintenance fees, and the like. The management and scheduling of these legal matters may be managed by a docketing server application (described below) which may include a set of templates, data, instructions, applications, or computer programs. Alternatively or additionally, the docketing system 100 may provide a visible, accessible, user-interface to internal and external entities through which the legal matters are manually managed.

The user device 110 in FIG. 1 may be a desktop computer, a laptop computer, a portable electronic device such as a cellular/mobile/smart phone, a tablet personal computer, a personal digital assistant or any equivalent device. The user device 110 may include a docketing client software to access the docketing server 130, or the user device 110 may include a web browser to access the docketing server 130, where the docketing server 130 provides the docketing service as a web application. Alternatively, the user device 110 may communicate with the docketing server 130 through other means, such as a remote desktop connection.

Additionally, the user device 110 communicates with the docketing server 130 via the computer network 120. The computer network 120 relates to a collection of devices interconnected by communication channels that allows sharing of information among the interconnected devices. In this example embodiment, the computer network 120 may be or include any wired or wireless network technology such as optical fiber, electrical cables, Ethernet, radio wave, microwaves, infrared transmission, wireless internet, communication satellites, cellular telephone signals, or an equivalent networking signal that interfaces with devices to create network. Specifically, in one embodiment, the user device 110 communicates with the docketing server 130 via the internet. In other embodiments, the user device 110 may be directly coupled with the docketing server 130 and/or may be integrated directly with, and be a part of, the docketing server 130.

In FIG. 1, one user device 110 is operably connected to communicate with the docketing server 130 via the computer network 120. However, in alternative embodiments a plurality of user devices 110 which may include various types of user devices 110 may simultaneously communicate with the docketing server 130. Additionally or alternatively, the docketing system 100 may include multiple docketing servers 130 which are operably connected to communicate information among the multiple docketing servers 130 and/or to communicate information among various user devices 110 operably connected to communicate with the docketing servers 130.

Figure 2A:
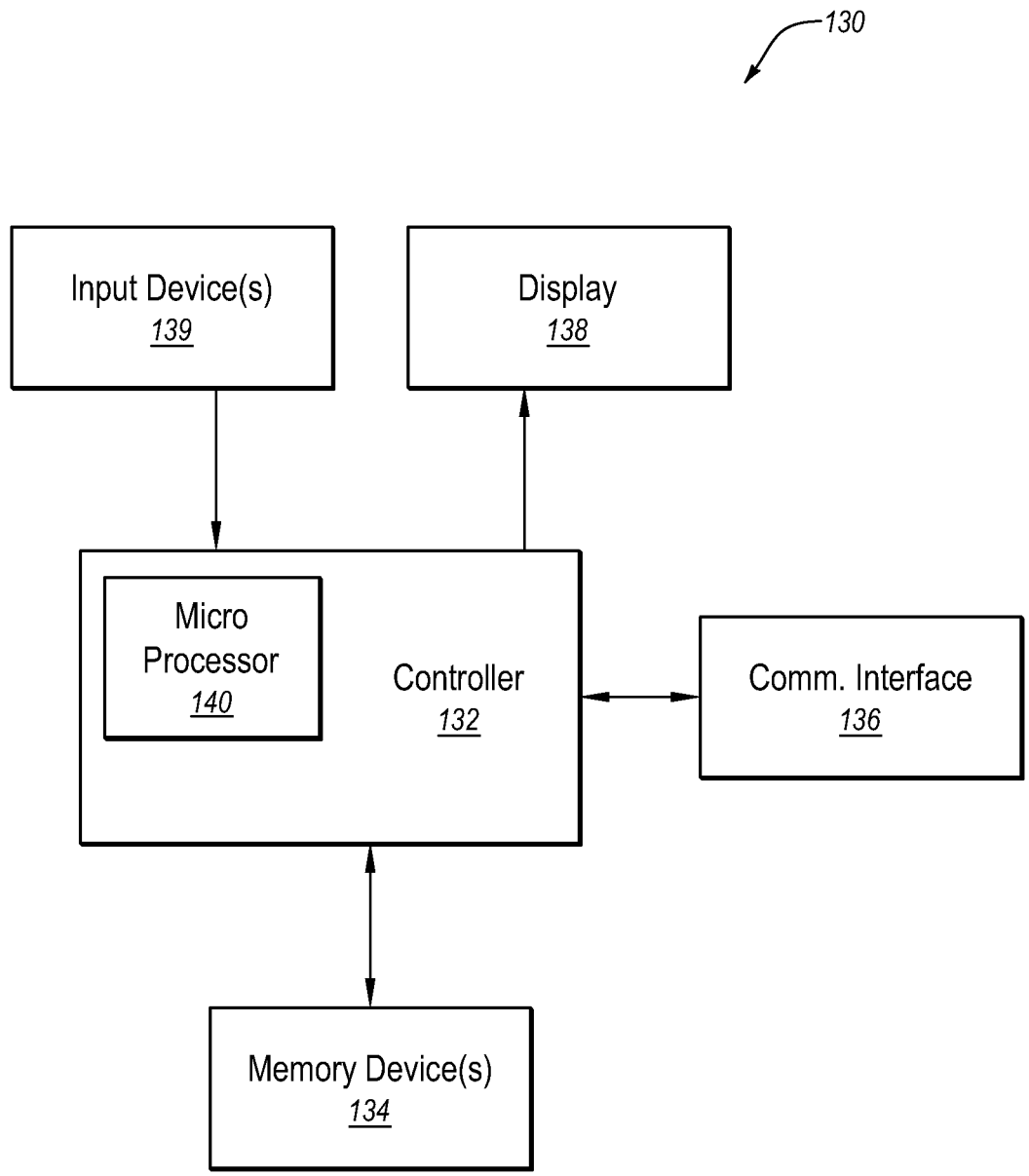
FIG. 2A illustrates an example docketing server of the docketing system of FIG. 1.

Turning next to FIG. 2A, additional details of the docketing server 130 are illustrated. As depicted in FIG. 2A, the docketing server 130 may include a controller 132, and a memory device 134. The controller 132 may include a microprocessor 140 which executes a docketing server application (not shown). The docketing server application may include templates, data, instructions, applications, or computer programs stored in a memory device 134. The docketing server application may vary as necessary to implement the docketing service.

In the embodiment illustrated in FIG. 2A, the controller 132 is operatively coupled to the memory device 134, which enables the controller 132 through the microprocessor 140 to access information stored on the memory device 134 such as the docketing server applications, an intellectual asset record (described below), and/or a file (described below). The memory device 134 may provide data to the controller 132 in various forms, such as, but not limited to, database records, files, bitstreams, and bytestreams, and the memory device 134 may comprise volatile or non-volatile memory or storage.

As illustrated in FIG. 2A, the docket server 130 can include a single controller 132, which can include a microprocessor 140 that executes a docketing server application, and a single memory device 134. However, in alternative embodiments, the docket server 130 may include one or more controllers 132, one or more microprocessors 140 which execute a plurality of docketing server applications, and one or more memory devices 134. The one or more memory devices 134 may be remotely located from each other and/or from the controller 132.

The docketing server 130 can include a communication interface 136. The communication interface 136 enables the docketing server 130 to communicate with the user device 110 (FIG. 1) via the computer network 120 (FIG. 1). Additionally, the communication interface 136 may enable the docketing server 130 to communicate with other docketing server applications either publically or privately available on the internet or through an interface between multiple docketing servers 130 which are operably connected via the computer network 120. Examples of the communication interface 136 include any receiver or transmitter capable of functioning with the computer network 120.

The docketing server 130 may further include a display 138 and one or more input devices 139. The docketing user (not shown) and/or a docketing server administrator (not shown) may directly interface and control the docketing server 130 through the display 138 and the input devices 139. Examples of the display 138 may include a thin film transistor liquid crystal display, liquid crystal display or an equivalent structure. Examples of the input devices 139 may include a QWERTY key pad, a ten key input pad, a mouse, a stylus, voice recognition software, an audio mixer, or may be integrated with the display 138 as in a touchscreen device using a surface acoustic wave, surface capacitance, projected capacitance, or an equivalent structure.

Figure 2B:
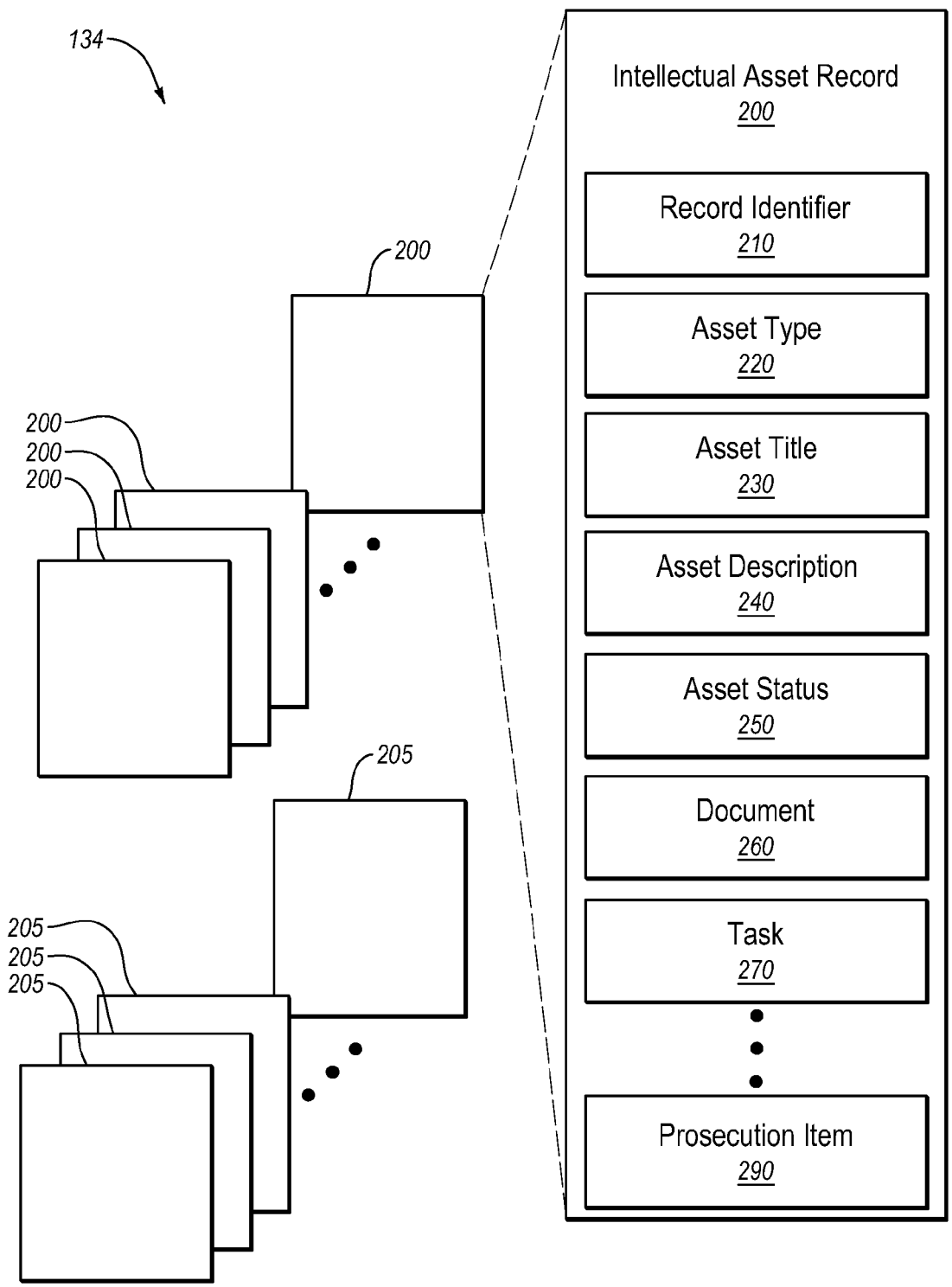
FIG. 2B illustrates example data that may be stored as part of an intellectual asset record on the docketing server of FIG. 2A.

Turning next to FIG. 2B, additional details of the memory device 134 are disclosed. FIG. 2B illustrates data that may be stored in the memory device 134. Specifically, in an embodiment of the docketing server 130 used in an intellectual asset management system, which can support docketing and other related activities of intellectual property assets, the data may include intellectual asset records 200 and/or files 205.

In alternative embodiments, the files 205 and the intellectual asset records 200 may be stored separately. For example, the files 205 may be stored on a first memory device and the intellectual asset records 200 may be stored on a second memory device. In this example, the first memory device may be located in the docketing server 130 (FIG. 2A) and the second memory device may be located in a remote site. Alternatively, the file 205 and the intellectual asset record 200 may both be stored on a same memory device 134. Other data may additionally or alternatively be stored in the memory device 134 including but not limited to docketing server applications, networking information, docketing user demographic or statistical information, docketing server administrator permissions, etc.

FIG. 2B further illustrates the potential contents of the intellectual asset records 200. Generally, the intellectual asset records 200 include a set of related data organized into meaningful units which pertain to an intellectual asset such as a patent, a trademark, copyright, or the like. For example, the set of related data of the intellectual asset records 200 may be organized into the meaningful units including a record identifier 210, an asset type 220, an asset title 230, an asset description 240, an asset status 250, a document 260, a task 270, and a prosecution item 290. Each of these meaningful units will be briefly discussed below.

With respect to the embodiment illustrated in FIG. 2B, the record identifier 210 is an identifier uniquely identifying the intellectual asset record 200 and can be used to reference the intellectual asset record 200. The asset type 220 may be used to distinguish between various types of intellectual assets, such as patents, trademarks, copyrights, trade secrets, etc. The asset title 230 may provide a human-readable name for the intellectual asset record 200, and the asset description 240 may provide a human-readable summary of the intellectual asset record 200. The asset status 250 may indicate the current status such as pending, abandoned, issued, etc. of the intellectual asset associated with the intellectual asset record 200.

Examples of the document 260 may include but is not limited to an archive, a record, a report, a paper, an article, a reference, a response, an action, a correspondence, a memorandum, an audio recording, a video recording, a photo, or a drawing. The document 260 is associated with the intellectual asset record 200 by being linked to the intellectual asset record 200. The link between the intellectual asset record 200 and the document 260 can be implemented through various techniques which may include, storing in the intellectual asset record 200 a file path to the document 260, storing in the intellectual asset record 200 a database reference to the document 260, and the like. Additionally, the document 260 may be stored within the intellectual asset record 200 as illustrated in FIG. 2B or alternatively, the document 260 may be stored separately from the intellectual asset record 200.

In the embodiment illustrated in FIG. 2B there is one document 260 associated with the intellectual asset record 200. However, the document 260 may be a plurality of documents 260 which may include various examples listed above. Additionally or alternatively, the plurality of documents 260 may be associated with one intellectual asset record 200, the plurality of documents 260 may be associated with multiple intellectual asset records 200, or some subset of the plurality of documents 260 may be associated with one or more intellectual asset records 200 within the docketing system 100 (FIG. 1). Once the file 205 is associated with the intellectual asset records 200, the file 205 is also referred to as the document 260.

Generally, the task 270 denotes an action for a specified docketing user to complete by a specified time. Some examples of the task 270 may include but are not limited to instructing outside counsel, attending meetings, etc. Like the document 260, the task 270 may be a plurality of tasks 270. That is, multiple tasks 270 may be, and commonly are, associated with the intellectual asset record 200.

The prosecution item 290 denotes an action related to the prosecution of an intellectual asset. The prosecution item 290 may include a signal that may indicate that an additional prosecution items 290 and/or tasks 270 is required following completion of the first prosecution item 290. For example, the intellectual asset record 200 may include a first prosecution item 290 that, as a result of the first prosecution item 290, one or more tasks 270 or a second prosecution item 290 must be completed.

In alternative embodiments, an intellectual asset record 200 may include a set of related data which may be organized into meaningful units that may include any subset of those meaningful units listed above or may include various others not listed. For example, an embodiment of an intellectual asset record 200 may include a record identifier 210, a document 260, a task 270, and a prosecution item 290 and omit the asset type 220, the asset title 230, the asset description 240, and/or the asset status 250.

As stated above with reference to FIG. 1, the docketing system 100 enables the user device 110 to access the docketing server 130 to obtain the docketing service. Some examples of means to access the docketing server 130 include a docketing client software and/or a web browser loaded on the user device 110. Alternatively, the user device 110 may communicate with the docketing server 130 through a remote desktop connection. In embodiments with the web browser, the docketing server 130 provides the docketing service as a web application.

To provide the docketing service, examples of the docketing system 100 may allow the docketing user to interface with the docketing server 130. The interface between the docketing user and the docketing server 130 may utilize user interface ("UI") objects. The UI objects provide the docketing user information related to a specific meaningful unit such as the task 270 (FIG. 2B), the document 260 (FIG. 2B), or the prosecution item 290 (FIG. 2B). Additionally or alternatively the set of UI objects may allow the docketing user to modify the information contained in the meaningful units.

Depending on the configuration of the docketing system 100, the UI objects may be created and provided to the docketing user differently. For example, the UI objects may be created by the docketing server 130 and may be provided to the web browser loaded on the user device 110. In this embodiment, the web browser renders the UI objects which may be described in HTML, JavaScript, CSS or an equivalent language. In alternative embodiments, the UI objects may be implemented as a dedicated client on the user device 110 or the UI objects may be implements by the docketing user interfacing directly with the docketing server 130.

An example docketing service may be the association of a file 205 with an intellectual asset record 200. This docketing service may utilize UI objects. In one embodiment of the association of a file 205 with an intellectual asset record 200, the UI objects utilized may include an UI object providing details of tasks associated with an intellectual asset record 200, an UI object for a docketing user to add a prosecution item to an intellectual asset record 200, and an UI object providing details of documents associated with an intellectual asset record 200. In alternative embodiments, the association of a file 205 with an intellectual asset record 200 may include other UI objects. Details of associating a file 205 with an intellectual asset record 200 and the UI objects utilized therein are disclosed below.

Figure 3:
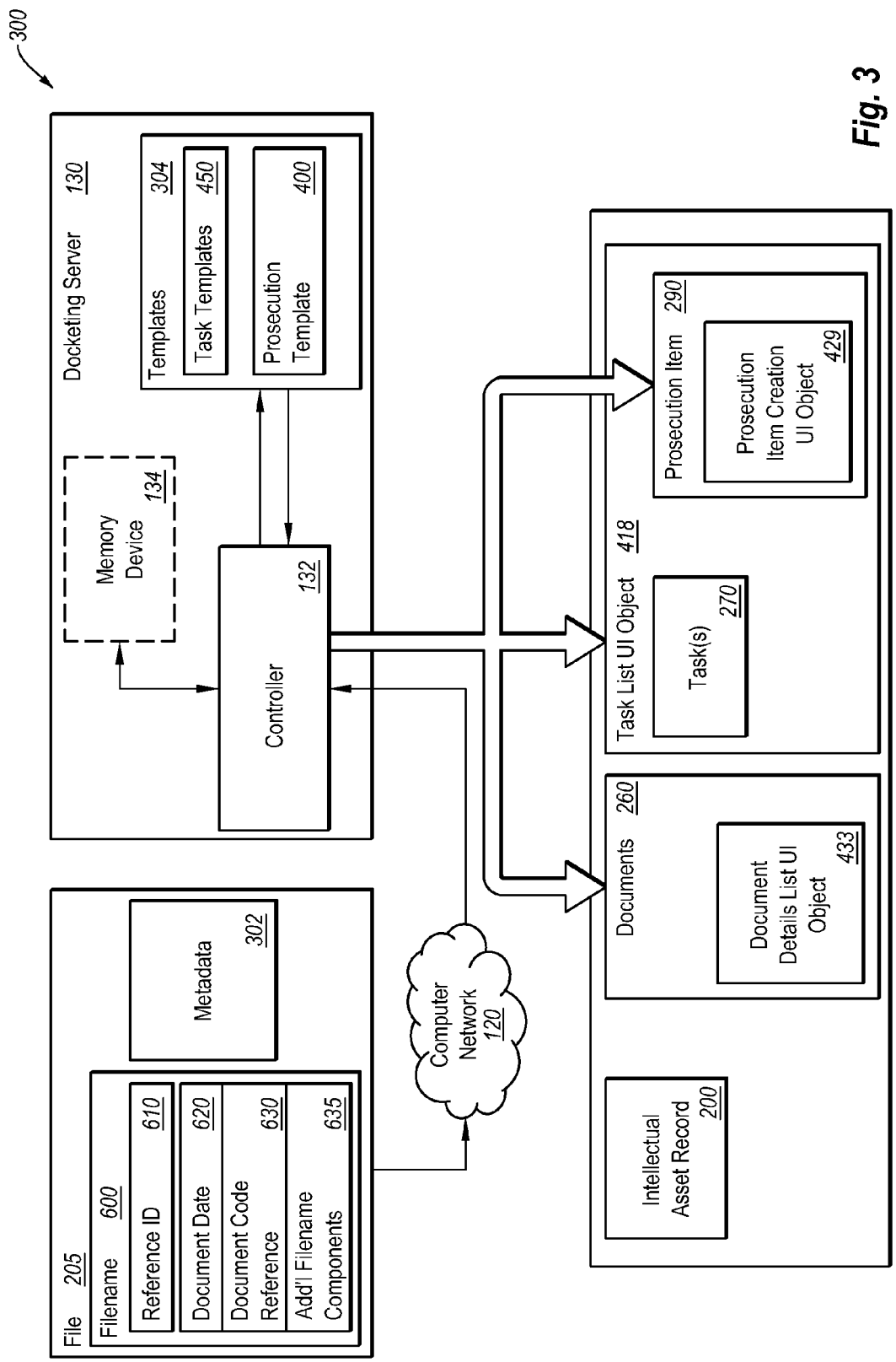
FIG. 3 illustrates an example system for automatically associating a file with an intellectual asset record and for automatically adding one or more tasks or prosecution items to an intellectual asset record.

Referring next to FIG. 3, an example of a docketing system performing the docketing service of associating a file 205 with an intellectual asset record 200 (hereinafter "an associating system") 300 is illustrated. As depicted the associating system 300 includes a file 205, a controller 132, templates 304, a computer network 120, and an intellectual asset record 200. The associating system 300 will be briefly introduced, and detailed disclosures are included below.

The controller 132 of the associating system 300 takes as an input the file 205 which has information pertaining to the file such as a file name 600 and metadata 302. The file 205 which has information pertaining to the file such as a file name 600 and metadata 302 may be transmitted via the computer network 120 as illustrated in FIG. 3. The file name 600 and metadata 302 may have predetermined formats.

Alternatively or additionally, the file 205 may be stored in a memory device 134 which may be included in a docketing server 130 coupled with the controller 132. For example, as illustrated in FIG. 3, a memory device 134 may be coupled with a controller 132. The controller 132 may scan the memory device 134 for a file 205 with a file name 600 or metadata 302 with the predetermined format or a specific set of metadata 302. The scanning of the memory device 134 by the controller 132 may occur on a regular schedule, may be triggered as a scheduled process on a docketing server, or may be manually triggered by a docketing user.

The file name 600 includes one or more fields and can be written with a predetermined format which is discussed in detail below with respect to FIG. 6. Generally, the file name 600 may include fields such as a reference identifier 610, a document date 620, a document code reference 630, and additional file name components 635.

Referring again to FIG. 3, the controller 132 reads the file name 600 and extracts one or more of the fields. According to the information in the extracted fields, the controller 132 associates the file 205 with the intellectual asset record 200. For example, the controller 132 may extract the reference identifier 610. From the reference identifier 610, the controller 132 may associate the file 205 with the intellectual asset record 200 having the same or a corresponding record identifier 210 through linking the file 205 to the intellectual asset record 200.

Additionally or alternatively, the controller 132 may extract the document date 620. The controller 132 may store the document date 620 in the intellectual asset record 200 as the document date value and/or the document date 620 may be stored as a base/mailing date (discussed below).

Additionally or alternatively, the controller 132 may extract the document code reference 630 from the file name 600. From the document code reference 630, the controller may store a document type and a document description (discussed below) associated with the document code reference 630. Additionally as illustrated in FIG. 3, the controller 132 may match the document code reference 630 to one or more templates 304. The templates 304 include information from which a meaningful unit of related data pertaining to an intellectual asset may be organized. For example, the templates 304 may include a task template 450 and/or a prosecution template 400 from which a meaningful unit such as a task 270 or a prosecution item 290 may be organized.

In an example embodiment, the controller 132 may match the document code reference 630 to a task template 450. Using the task template 450 a task 270 associated with the task template 450 may be created in the intellectual asset record 200. In this example, the creation of the task 270 in the intellectual asset record 200 may utilize a task list UI object 418. In alternative embodiments the task 270 may be created in the intellectual asset record 200 without utilizing the task list UI object 418.

In another example, the controller 132 may match the document code reference 630 to a prosecution template 400. Using the prosecution template 400, a prosecution item 290 may be created in the intellectual asset record 200. In this example the creation of the prosecution item 290 may utilize a prosecution item creation UI object 429. In alternative embodiments the prosecution item 290 may be created in the intellectual asset record 200 without utilizing the prosecution item creation UI object 429.

Additionally or alternatively, the controller 132 may read the metadata 302 pertaining to the file 205. Generally, metadata 302 includes data about the file 205 such as an author, a check in comment, a citation status identifier, a class, a correspondence date, a country identifier, a description, a document management folder identifier, a document management status, a document management type identifier, a file extension, a file size, a file upload type identifier, an issue date, a kind code, a link record file identifier, a number type identifier, an original file, an owner, a publication date, a recipient, a source identifier, and a sub-class.

When the controller 132 associates the file 205 with the intellectual asset record 200, making the file 205 a document 260, the metadata 302 may define the details of the document 260. Some details may be defined from the metadata 302 itself, other details may be provided automatically based on the contexts of the association of the file 205, and still other details may be manually entered by the docketing user.

The details of the document 260 that may be defined by the metadata 302 can include, but are not limited to, an author, a check in comment, a citation status identifier, a class, a correspondence date, a country identifier, a description, a document management folder identifier, a document management status, a document management type identifier, a file extension, a file size, a file upload type identifier, an issue date, a kind code, a link record file identifier, a number type identifier, an original file, an owner, a publication date, a recipient, a source identifier, and a sub-class.

The data about the file 205 included in the metadata 302 such as the file upload type identifier or issue date can also be used as defined conditions. The defined conditions can indicate to the controller 132 a characteristic such as the type, kind, category, or nature of the file 205. The defined conditions act to triggers the controller 132 to perform one or more defined actions. That is, based on the defined conditions within the metadata 302, the controller 132 performs defined actions that can include, but are not limited to, creating one or more tasks 270, creating one or more prosecution items 290, modifying value(s) in the task list UI object 418, modifying value(s) in the prosecution item creation UI object 429, associating the file 205 with one or more intellectual asset record(s) 200, providing a message to the docketing user such as composing and/or sending email(s), recording an event in an intellectual asset record, modifying the set of related data included in an intellectual asset record, and/or associating the document 260 with a specific task 270 or prosecution item 290.

For example, a file 205 may be a non-disclosure agreement ("NDA") with metadata 302 including an author, a date, and a document size pertaining to the NDA. Moreover, contained in the metadata 302 of the NDA may be a defined condition indicating that the file 205 is an NDA. When the NDA is uploaded, the controller 132 reads the metadata 302 of the file 205. The author, the date, and the document size may define the details of the document 260 associated with an intellectual asset record 200. Additionally, based upon the defined condition, the controller 132 may perform defined actions related to the NDA. Example defined actions may include creating a task 270 for a case manager to review the NDA, and/or the controller 132 may compose and send an email to a case manager. The email may include the author and/or the date contained in the metadata 302 of the NDA or alternatively the email may include information manually entered by a docketing user or automatically generated based on the contexts of the association of the NDA.

Additionally, the controller 132 may include a set of rules that dictate which defined action the controller 132 performs based on a particular defined condition. In some embodiments, the controller 132 may enable modification of the set of rules based on a particular defined condition.

For example, the docketing user may modify the set of rules such that when a file 205 which is an application draft is uploaded, the controller 132 is triggered to perform the defined action of creating a task 270 for a case manager to review the file 205. The docketing user may establish the particular defined condition as "application draft" and further modify a corresponding rule in the set of rules such that the controller 132 is triggered to create a task 270 for a case manager to review the file 205. Thus, anytime a file 205 is uploaded with metadata 302 including "application draft" as the particular defined condition, the controller 132 will be triggered to create a task 270 for a case manager to review the file 205. Additional description of the various components and items of the associating system 300 are disclosed below.

Turning next to FIG. 4A, additional details of the task list UI object 418 are disclosed. As illustrated in FIG. 4A, the task list UI object 418 provides details on the tasks 270 (illustrated as a first task 270A, a second task 270B, and a third task 270C) associated with the intellectual asset record 200. For example, the task list UI object 418 may display information, referred to generally as values, related to the task 270 such as a due date value 412, a target value 414, and a task name value 416. Ultimately, the task list UI object 418 relates information with an action that is to be accomplished. The action may be specifically described by the task 270 in a docketing schedule (not shown).

In the example third task 270C provided in FIG. 4A, the due date value 412 is Dec. 8, 2011; the target value 414 is John Smith; and the task name value 416 is "Application—Final Deadline to Foreign File." In this example, the above values mean that John Smith needs to file a foreign application by Dec. 8, 2011 for the intellectual asset associated with the intellectual asset record 200. In the above example, the action is what John Smith needs to do, that is, "file a foreign application" which may be described by the task 270 in John Smith's docketing schedule.

Figure 4B:
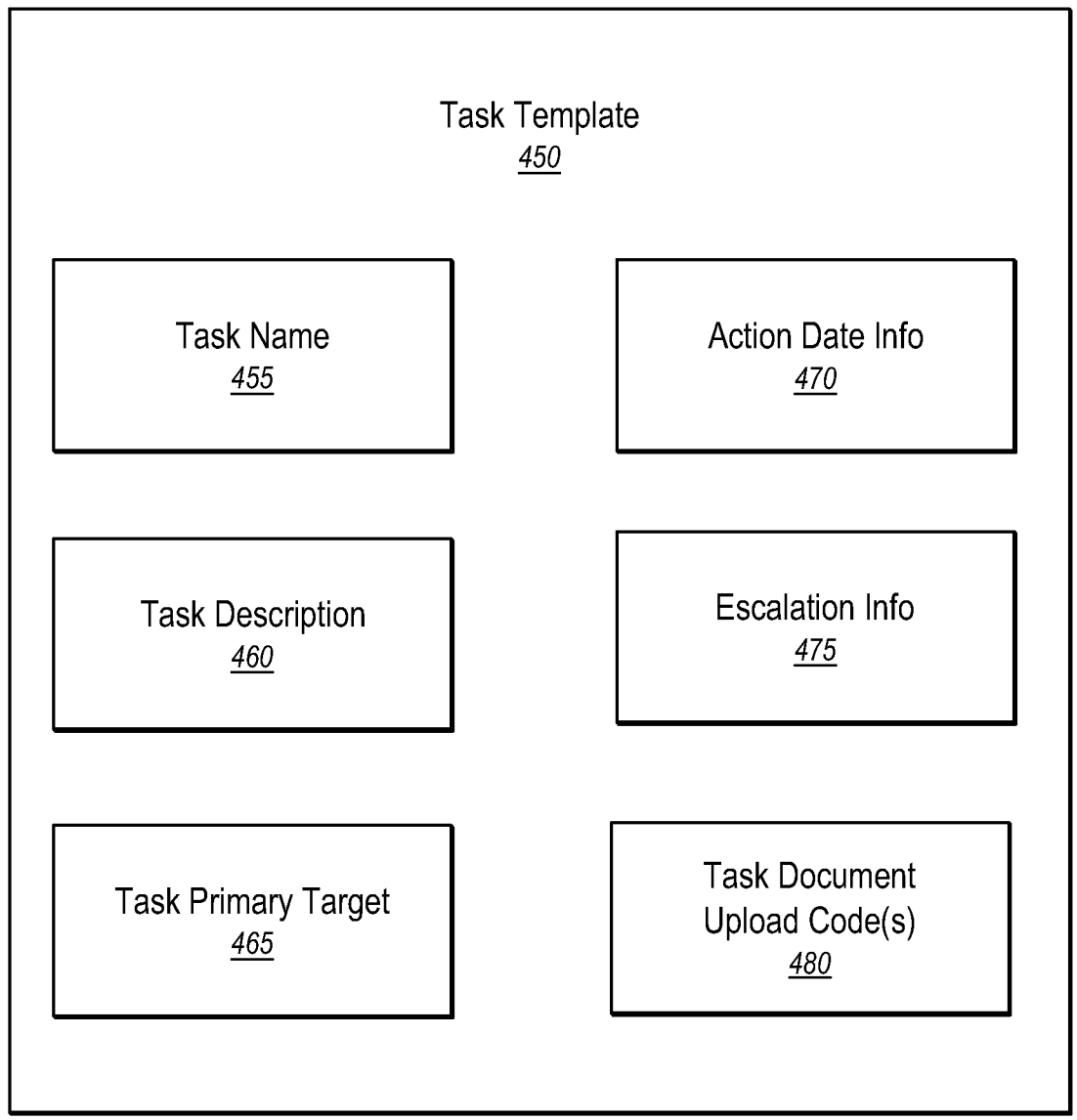
FIG. 4B illustrates an example task template.

The task 270 can be created by the docketing user or automatically by the docketing server 130. In either case, that is if the task 270 is created by the docketing user or automatically by the docketing server 130, a task template 450 may be used to create a task 270. FIG. 4B illustrates an example task template 450. As illustrated in FIG. 4B, the task template 450 may include a task name 455, a task description 460, a task primary target 465, action date information 470, escalation information 475, and one or more task document upload codes 480.

When the docketing user or the docketing server 130 utilizes the task template 450 to create the task 270, the values of the task template 450 are used for the task 270. The task name 455 and the task description 460 provide a name and description, respectively, for the task 270 created from the task template 450. The task 270 is directed to the task primary target 465, with dates for the task 270 to be displayed and/or completed defined in the action date information 470. The task document upload codes 480 refer to the document code item 500 which associates a document 260 with the task 270 described in detail with respect to FIG. 5.

Therefore, in the task list UI object 418 for the tasks 270, the task name 455 is then displayed as the task name value 416, the task primary target 465 is then displayed as the target value 414, and the action date info 470 determines what is displayed for the due date value 412. If defined, the escalation information 475 provides details on escalation paths to be taken in the case that the task primary target 465 does not complete the task 270 by the "to be completed" date which may be additionally defined in the action date information 470.

Figure 4C:
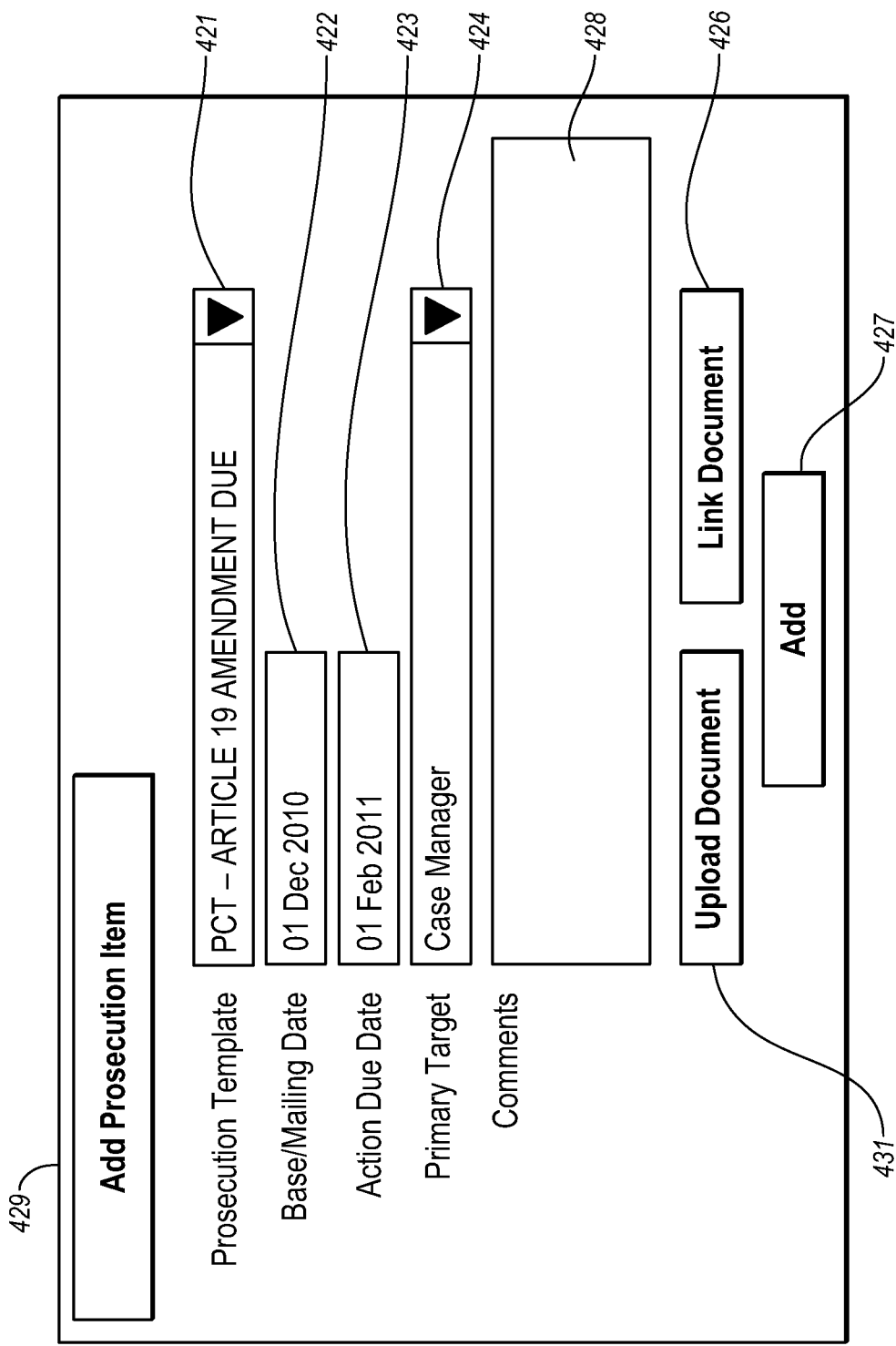
FIG. 4C illustrates an example user interface object used to add a prosecution item to an intellectual asset record.
Figure 4D:
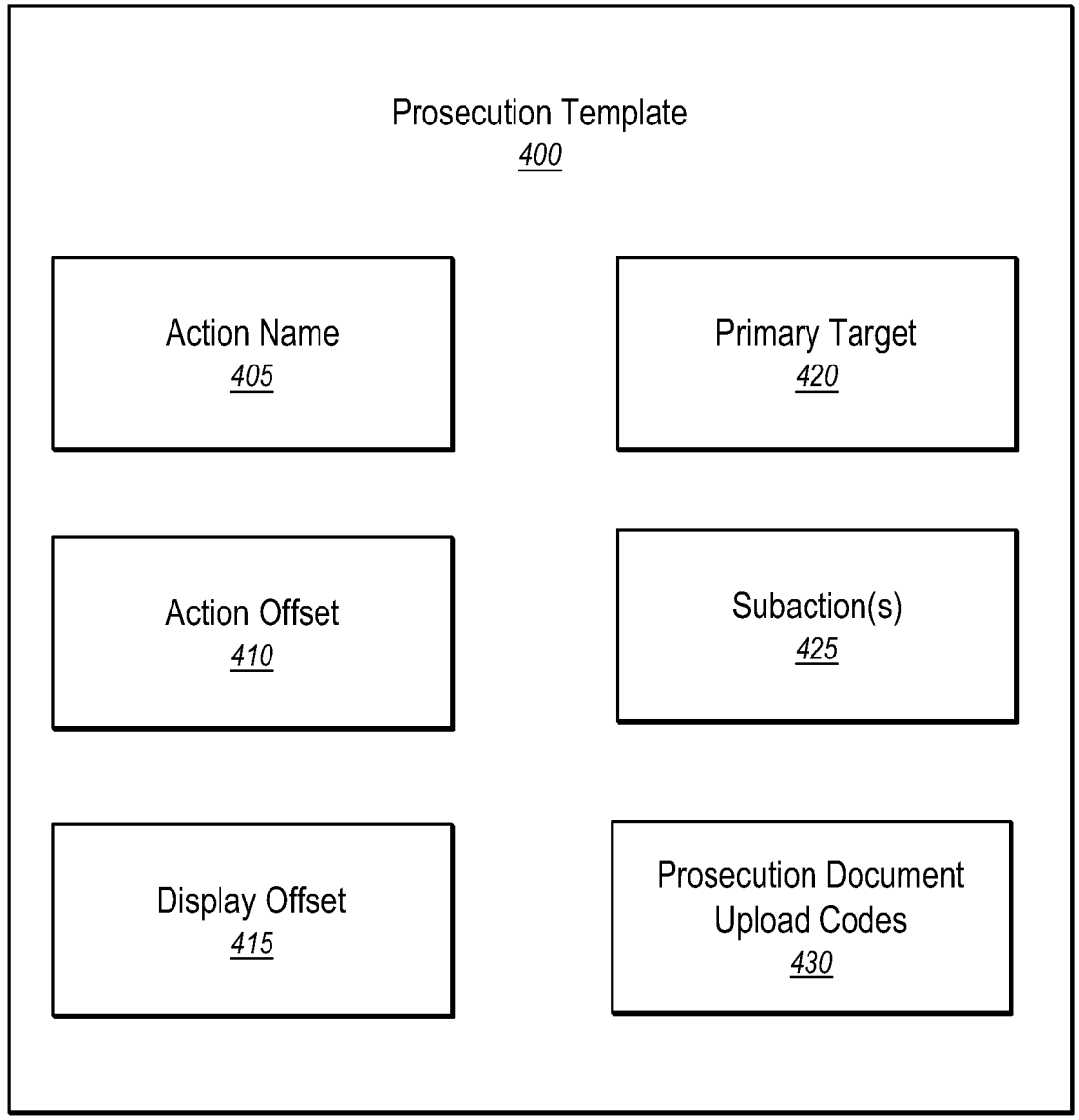
FIG. 4D illustrates an example prosecution template.

Turning next to FIG. 4C in combination with FIG. 4D, additional details of the prosecution item creation UI object 429 and the prosecution template 400 are disclosed. Generally, the prosecution item creation UI object 429 and the prosecution template 400 are used to add the prosecution item 290 to the intellectual asset record 200.

First, FIG. 4C depicts an example of the prosecution item creation UI object 429. As illustrated in FIG. 4C, the prosecution item creation UI object 429 may include a prosecution template selector 421, a base/mailing date value 422, an action due date value 423, a primary target selector 424, a comments value 428, an upload document button 431, a link document button 426, and an add button 427. Example function of each of these items is briefly discussed below.

The primary target selector 424 allows the docketing user to choose a target for the prosecution item 290. A target is usually an entity or entities responsible for completion of the prosecution item 290. In some embodiments the primary target selector 424 may include a drop-down menu with potential or available targets that may be selected as a target. In the embodiment illustrated in FIG. 4C, the prosecution item creation UI object 429 allows the docketing user to associate one or more documents 260 with the prosecution item 290. If a document 260 is not already associated with the intellectual asset record 200 (an unassociated document) the docketing user may associate one or more unassociated documents with the prosecution item 290 through use of the upload document button 431. Additionally, if a document 260 is already associated with the intellectual asset record 200 but not associated with the prosecution item 290 (an associated document), the docketing user may associate one or more associated documents with the prosecution item 290 through use of the link document button 426.

The docketing user may additionally enter a date into the base/mailing date value 422. The base/mailing date value 422 may correspond to an initiation date such as the mailing date of a patent office action. Likewise, the docketing user may enter a date into the action due date value 423. The action due date value 423 may correspond to a completion date such as six months from the mailing date of an USPTO office action. The comment value 428 allows the docketing user to add supplementary information to the prosecution item creation UI object 429.

In one embodiment, the docketing user may manually input the base/mailing date value 422 and the action due date value 423, manually select the target using the primary target selector 424, and/or manually associate documents 260 with the prosecution item 290 using the upload document button 431 or the link document button 426. In this embodiment, when the document user is satisfied with the contents of the prosecution item 290, the docketing user may select the add button 427 to create prosecution item 290 containing the above information. Additionally or alternatively, the docketing user may create a prosecution item 290 using the prosecution template selector 421 as discussed below.

With combined reference with FIGS. 4D and 4C, through interfacing with the prosecution item creation UI object 429, the docketing user may use the prosecution template selector 421 to select the prosecution template 400. Generally, the prosecution template 400 includes formatted information related to a given prosecution-related action according to legal or potentially corporate/private standards or preferences. The prosecution template 400 is used as a basis for creating the prosecution item 290. FIG. 4D illustrates an example prosecution template 400 which may include an action name 405, an action offset 410, a display offset 415, a prosecution primary target 420, one or more sub-actions 425, and one or more prosecution document upload codes 430.

When the docketing user selects the prosecution template 400 using the prosecution template selector 421, and the docketing user selects the add button 427, the prosecution item 290 is thereby created. The prosecution item 290 then includes the values determined by the prosecution template 400.

For example, the prosecution item 290 may include the action name 405. By selecting the prosecution template 400, the action name 405 describes the task name value (416, FIG. 4A) for the task 270 to create and associate with the intellectual asset record 200. The action offset 410 may set a default due date value (412, FIG. 4A) for the prosecution-related action. The display offset 415 in this example can be set to a configurable date offset for when the primary target 420 wants to be alerted of the next task 270 on the docketing schedule, which is usually before the date provided in the due date value 412.

In a more specific example embodiment, the prosecution template 400 may be a USPTO non-final office action rejection. As a result of creating the prosecution item 290 using the prosecution template 400 for the non-final office action rejection, the task name value 416 for the next task 270 could be "File response to non-final office action rejection," and the action offset 410 in this example would be set to three months by default, which would then accordingly set the due date value 412 to the base/mailing date value 422 value plus the action offset 410.

Additionally, the prosecution template 400 may include one or more sub-actions 425. The sub-actions 425 may include additional tasks 270 associated with the prosecution item 290. In the same example, the one or more sub-actions 425 may include the additional task 270 to instruct outside counsel to file an office action response.

Additionally, as illustrated in FIG. 4D, the prosecution template 400 may include one or more prosecution document upload codes 430. Similar to the task document upload codes 480, the prosecution document upload codes 430 refer to the document code item 500 which associates a document 260 with the prosecution item 290 described in detail with respect to FIG. 5.

Figure 4E:
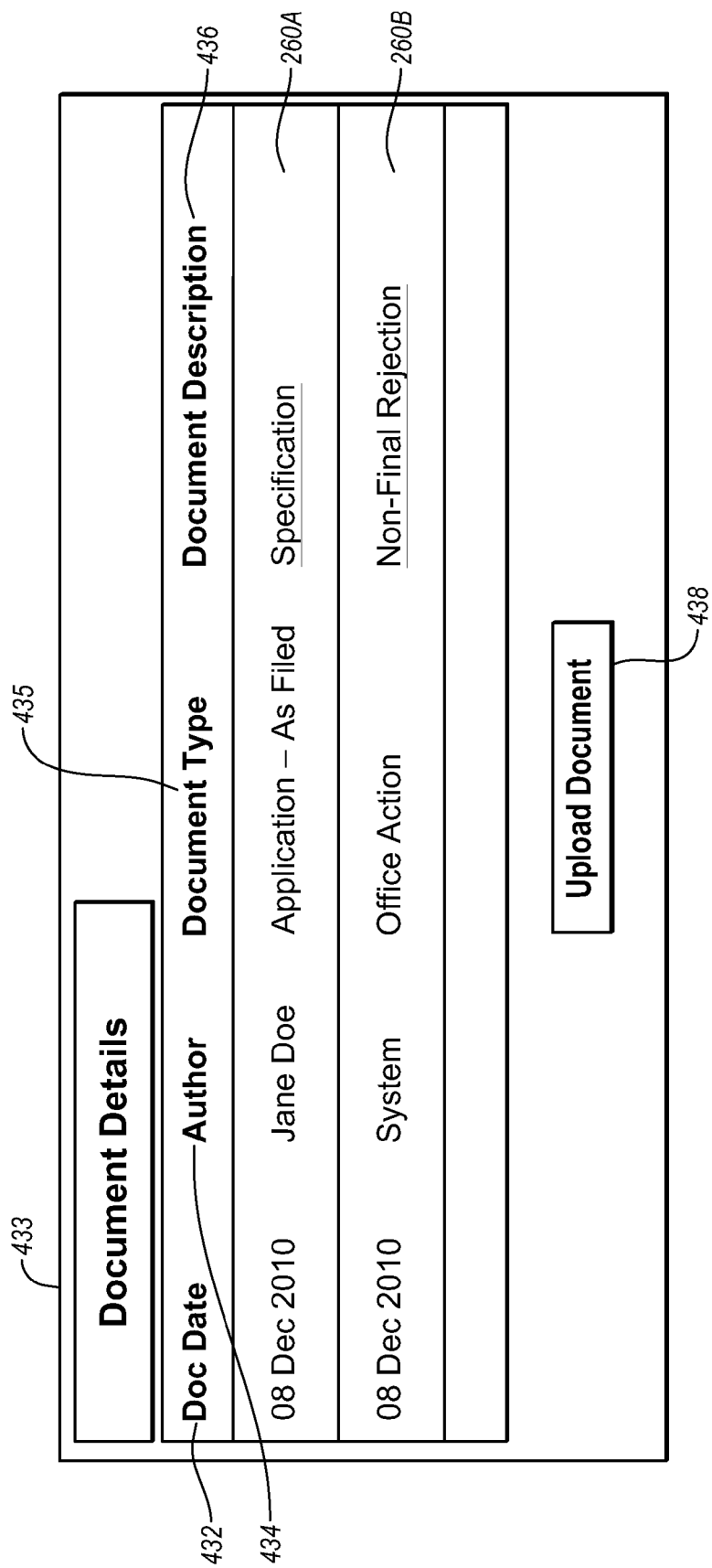
FIG. 4E illustrates an example user interface object providing details on documents associated with an intellectual asset record and providing a method for a docketing user to upload a document to an intellectual asset record.

Turning next to FIG. 4E, additional details of the document details list UI object 433 are disclosed. As illustrated in FIG. 4E an example document details list UI object 433 may provide details of documents 260 (illustrated as a first document 260A and a second task 260B) associated with the intellectual asset record 200. For the documents 260 detailed in the document details list UI object 433, there may exist a document date value 432, an author value 434, a document type value 435, a document description value 436, and an upload document button 438.

The document date value 432 provides the base date for the document. Examples of the document date value 432 may include the mailing date of an office action, the date an application was filed, and the like. The author value 434 provides the name or names of the originator(s), linker(s), or modifier(s) of the document 260. Examples of the author value 434 may include a name of a specific person, a general term such as "docketing" or "secretarial suite", or may include general terms related to governmental or private entities. The document type value 435 provides the general type of the document 260. The document type value 435 may be relatively specific or a general term understood by the docketing users as a type of document 260. The document description value 436 is a brief description of document 260 which may be relatively specific or a general term understood by the docketing users as a characterization of the document 260. Generally, the document description value 436 further describes the document type value 435. The upload document button 438 can be used by the docketing user to upload the document 260 and associate the document 260 with the intellectual asset record 200.

In the example second document 260B provided in FIG. 4E, the document date value 432 is Feb. 8, 2010, the author value 434 is "System", the document type value 435 is "Office Action", and the document description value 436 is "Non-Final Rejection". This may mean that the second document 260B is a non-final rejection office action with a base date of Feb. 8, 2010, and that the docketing server 130 (i.e., "System") linked the document 260 with the intellectual asset record 200.

In alternative embodiments the details of the document 260 may include any information related to the document 260 including but not limited to: an author, a check in comment, a citation status identifier, a class, a correspondence date, a country identifier, a description, a document management folder identifier, a document management status, a document management type identifier, a file extension, a file size, a file upload type identifier, an issue date, a kind code, a link record file identifier, a number type identifier, an original file, an owner, a publication date, a recipient, a source identifier, and a sub-class. As mentioned above, the details of the document 260 may be defined by metadata (302, FIG. 3) of the document 260. Specifically, the information related to the document 260 may be defined from the metadata itself, provided automatically based on the contexts of the association of the file 205, and/or manually entered by a docketing user.

Figure 5:
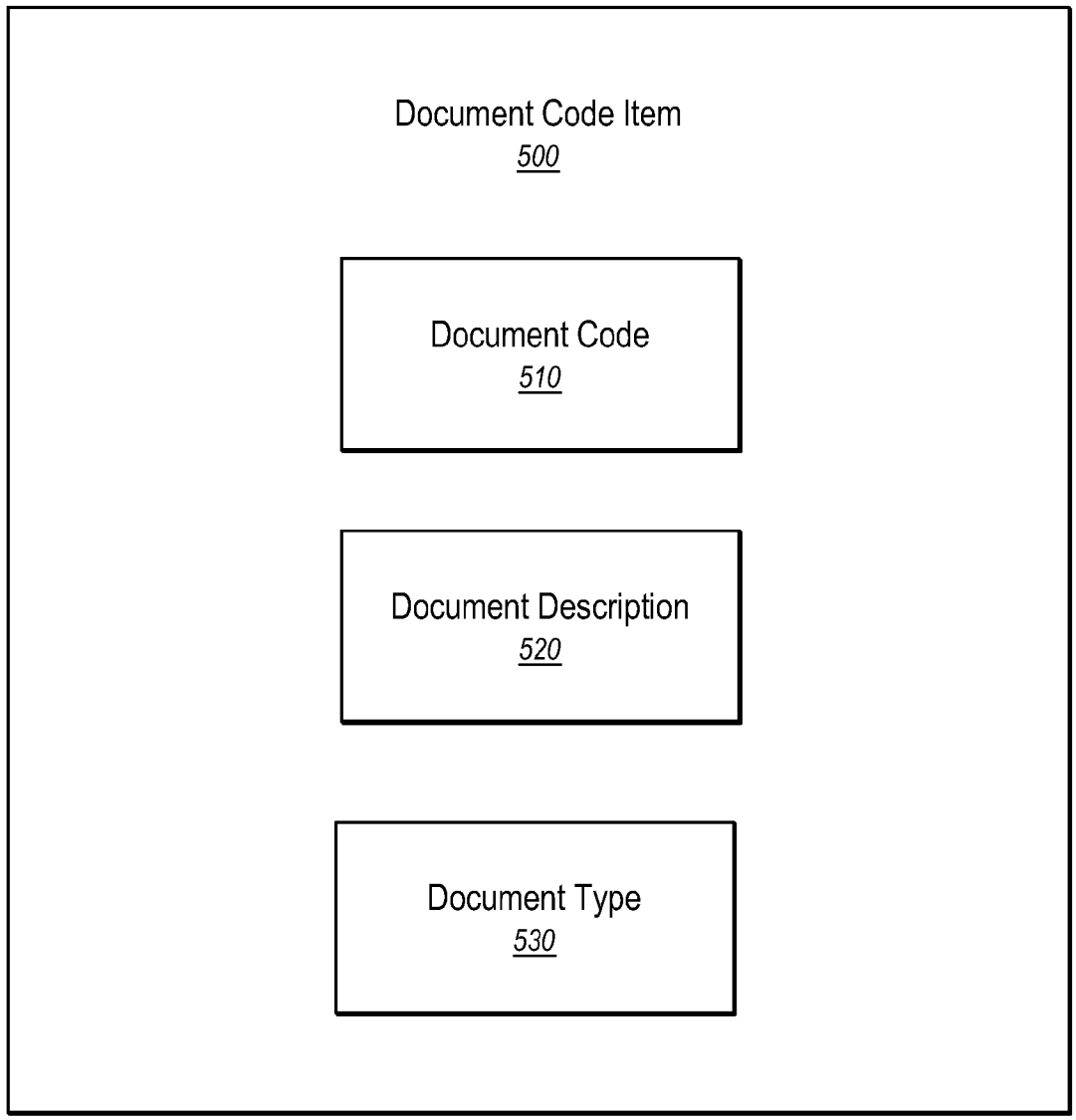
FIG. 5 illustrates an example document code item.

Referring next to FIG. 5, an example document code item 500 is illustrated. Generally, the document code item 500 connects the document 260 with an associated prosecution item 290 and/or a task 270 of a given intellectual asset record 200. Specifically, in one embodiment, the prosecution document upload code 430 (FIG. 4D) and the task document upload code 480 (FIG. 4B) refer to the document code items 500. This reference creates a link between the document 260 having the referenced document code item 500 with the prosecution item 290 and/or task 270 having the prosecution document upload code 430 or task document upload code 480, respectively, referring to the document code item 500.

In the above description, the document code item 500, the prosecution document upload code 430, and the task document upload code 480 are discussed singularly. However, in alternative embodiments, each of the document code item 500, the prosecution document upload code 430 and the task document upload code 480 may be plural in any combination. That is, a task 270 may have one or more task document upload codes 480. Likewise a prosecution item 290 may have one or more prosecution document upload codes 430. Multiple prosecution document upload codes 430 and/or task document upload codes 480 may reference more than one document code items 500.

As depicted in FIG. 5, the document code item 500 may include a document code 510, a document description 520, and a document type 530. In the example document code item 500, there are one each document code 510, document description 520, and document type 530. However, in alternative embodiments, the document code item 500 may include one or more document codes 510, document descriptions 520, and document types 530 in any combination.

The document code 510 is a code that references the type, source(s), etc. of a document 260. For example, the document code 510 "NFR" may mean "non-final rejection from the USPTO." The document description 520 can be utilized to populate the document description value 436 (FIG. 4E), and the document type 530 can be used to populate the document type value 435 (FIG. 4E).

Figure 6:
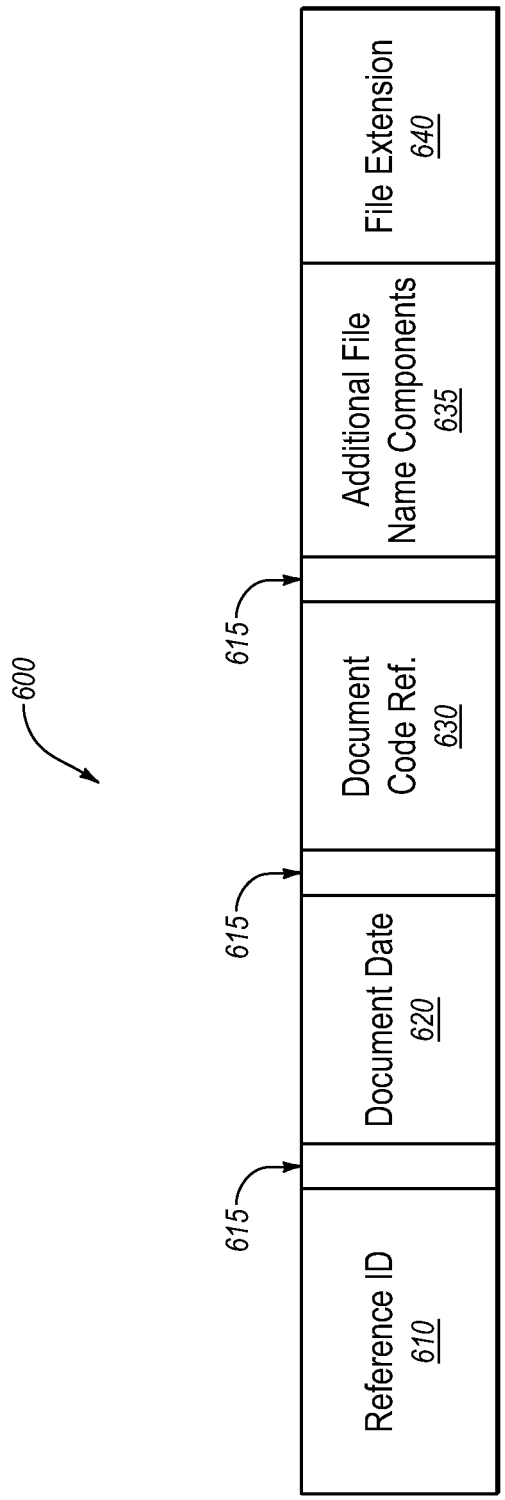
FIG. 6 illustrates an example predetermined format of a file name.

Referring now to FIG. 6, the fields of an example file name 600 of the file 205 is depicted. As illustrated in FIG. 6, the file name 600 may include fields such as a reference identifier 610, a delimiter 615, a document date 620, a document code reference 630, one or more additional file name components 635, and a file extension 640. In the embodiment depicted in FIG. 6 the order of the fields from left to right is as listed above, however, in alternative embodiments, the order of inclusion of the fields of the file name 600 may be rearranged.

The delimiter 615 delimits the fields of the file name 600. Any character or combination of characters (e.g., a space character) may be used to delimit the various fields of the file name 600. The reference identifier 610 can reference the record identifier 210 (FIG. 2A) of the intellectual asset record 200. The document date 620 provides a base or mailing date pertaining to the file 205 and may be stored as the document date value (discussed below). The document date 620 may be formatted according to a predetermined date format such as date-month-year, year-month-date, etc. The document code reference 630 references the document code item 500 by the document code 510. The one or more additional file name components 635 serve as human-readable descriptive text. Generally, the additional file name components 635 are not utilized by the controller 132 (FIGS. 8 and 2A), but can be read by the docketing user to provide supplemental information about the file 205. The one or more additional file name components 635 may additionally or alternatively contain the delimiter 615, which may be ignored by the controller 132.

The file extension 640 is an extension to a file, which varies by file type. For example, text files often have a file extension of ".txt", and portable document format files have a file extension of ".pdf". All file types can be supported, regardless of whether or not a file type includes human-readable text.

An example file name according to the file name 600 is "81024858 12-03-2010 NFR.pdf", where "81024858" is the reference identifier 610 identifying the record identifier 210, and thereby the intellectual asset record 200; "12-03-2010" is the document date 620; and "NFR" is the document code reference 630 which in turn refers to the document code 510 of a document code item 500. As above, this example, "NFR" as a document code reference 530 may reference document code 510 for a non-final rejection from the USPTO.

Potentially, a task 270 and/or a prosecution item 290 associated with the intellectual asset record 200 may have a prosecution document upload codes 430 and/or task document upload codes 480 that refer to the document code item 500 and may thereby be linked to the file 205 which following an association with the intellectual asset record 200 would be referred to as a document 260. Additionally or alternatively, the document code item 500 may prompt the automatic addition of one or more tasks 270 or prosecution items 290 to the intellectual asset record 200.

Figure 7:
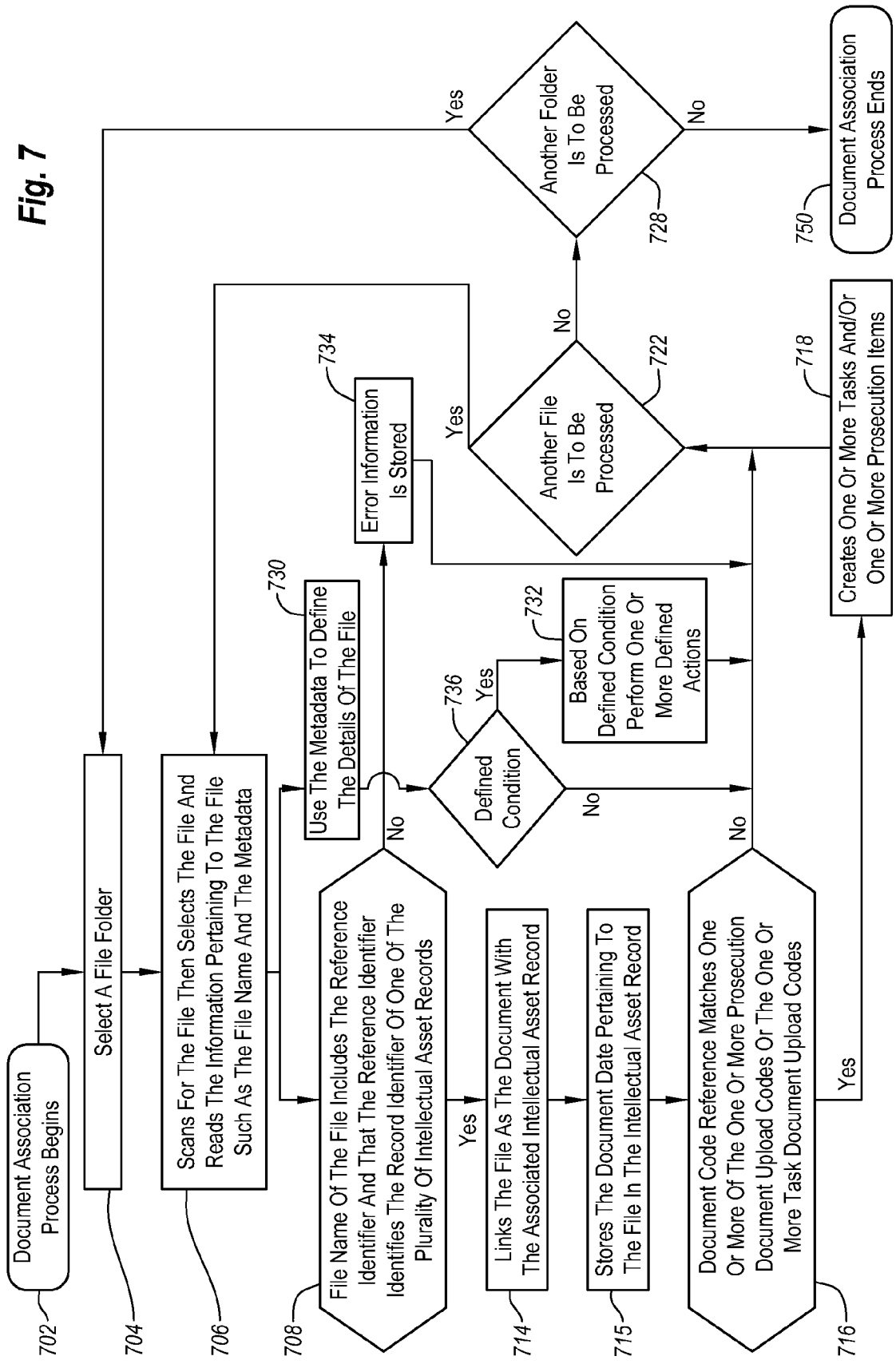
FIG. 7 illustrates an example method for automatically associating a file with an intellectual asset record and for automatically adding one or more tasks or prosecution items to an intellectual asset record.

Turning next to FIG. 7 in combination with FIG. 3, additional details of a method for automatically associating a file 205 with an intellectual asset record 200 are disclosed. Referring to FIG. 7, a flow diagram depicting an example method 700 for automatically associating the file 205 with the intellectual asset record 200 and for automatically adding one or more tasks 270 and/or prosecution items 290 to the intellectual asset record 200. The document association process 700 may be performed by an electronic device, such as the docketing server 130. Alternatively, the document association process 700 may be manually initiated by the docketing user, or may be automatically initiated according to a predefined schedule stored on the one or more of memory devices 134, with the pre-defined schedule read by the controller 132.

At 702 the document association process 700 begins. At step 704 the controller 132 of the docketing server 130 selects a file folder. The file folder may be a virtual, digital directory in which files 205 and other file folders can be organized and stored on the one or more memory devices 134. File folder selection is optional, and is used in the case where one or more files 205 have been stored in one or more file folders. The docketing user may, for example, download a set of files from a prosecution history with a patent office, copy and store the set of files 205 in one or more file folders, and then either manually initiate the document association process 700, or allow the controller 132 to automatically initiate the document association process 700 according to the predefined schedule. The docketing user can directly access the docketing server 130 through the one or more input devices 139 (FIG. 2A) to store the files 205 on the one or more memory devices 134, or the docketing user can use remote desktop on the user device 110 to connect to and communicate with the docketing server 130 to store the files 205 on the one or more memory devices 134. Alternatively, the docketing user can provide the files 205 to the docketing server 130 through a web browser interface (for example, through a drag-and-drop UI mechanism) on the user device 110 for a web application running on the docketing server 130, thereby initiating the document association process 700. Similarly, the docketing user can provide the files 205 to the docketing server 130 through a docketing client on the user device 110, thereby initiating the document association process 700.

Configuration information (not shown) can be stored on the one or more memory devices 134, wherein the configuration information is read by the controller 132 and can indicate which file folders to select, which files to skip, which type of date formatting to utilize (e.g., DD-MM-YYYY, MM-DD-YYYY, YYYY-MM-DD, etc.), and the like.

At 706 the controller 132 scans for the file 205, and then selects the file 205 and reads the information pertaining to the file 205 such as the file name 600 and the metadata 302. If at 708 the controller 132 determines whether that the file name 600 of the file 205 includes the reference identifier 610 and that the reference identifier 610 identifies the record identifier 210 of one of the plurality of intellectual asset records 200, then at 714 the controller 132 links the file 205 as the document 260 with the associated intellectual asset record 200 referred to by the reference identifier 610.

In an example embodiment, the controller 132 may need to copy or move the file 205 from a first memory device of the one or more memory devices 134 to a second memory device of the one or more memory devices 134 to link the file 205 with the associated intellectual asset record 200.

Using the document date 620, the controller 132 at 715 stores the document date 620 pertaining to the file 205 in the intellectual asset record 200, which then allows the docketing user to subsequently view the document details list UI object 433 to see the document date value 432 pertaining to the file 205, now referenced as the document 260.

Additionally or alternatively, at 706, the controller 132 may read the metadata 302 pertaining to the file 205. At 730, the metadata 302 may define the details of the file 205 which is referred to as the document 260 once associated with the intellectual asset record 200. At 736, whether the metadata 302 includes a defined condition is determined. If the metadata 302 includes a defined condition, at 732, the controller 132 may perform one or more defined actions such as creating one or more tasks 270 or composing and/or sending an email.

At 716, if the document code reference 630 is included, and the document code reference 630 matches one or more of the one or more prosecution document upload codes 430 or the one or more task document upload codes 480, then the controller 132 creates one or more tasks 270 and/or one or more prosecution items 290 accordingly.

If at 722 another file 205 is to be processed, then processing resumes at 706 to select and read the file 205 and continue subsequent processing. If there is not another file 205 to be processed, then at 728 if another folder is to be processed, then processing resumes at 704 to select the folder and continue subsequent processing.

If at 708 the format of the file name 600 is unrecognized, the document code reference 630 is unrecognized, or the reference identifier 610 does not reference the record identifier 210 of any intellectual asset record 200, then at 734, error information is stored in the one or more memory devices 134, and processing continues at 722.

Once all folders (if applicable) and all files have been selected and processed, the document association process 700 ends at 750 and is considered completed.

The embodiments described herein may include the use of a special purpose or general-purpose computer including various computer hardware or software modules, as discussed in greater detail below.

Embodiments within the scope of the present invention also include tangible computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system, methods, and other means for accomplishing functions disclosed herein are preferably implemented in software, implementations in hardware or a combination of software and hardware are also possible and contemplated. In this description, a "computing entity" may be any computing system as previously defined herein, or any module or combination of modulates running on a computing system.

Figure 8:
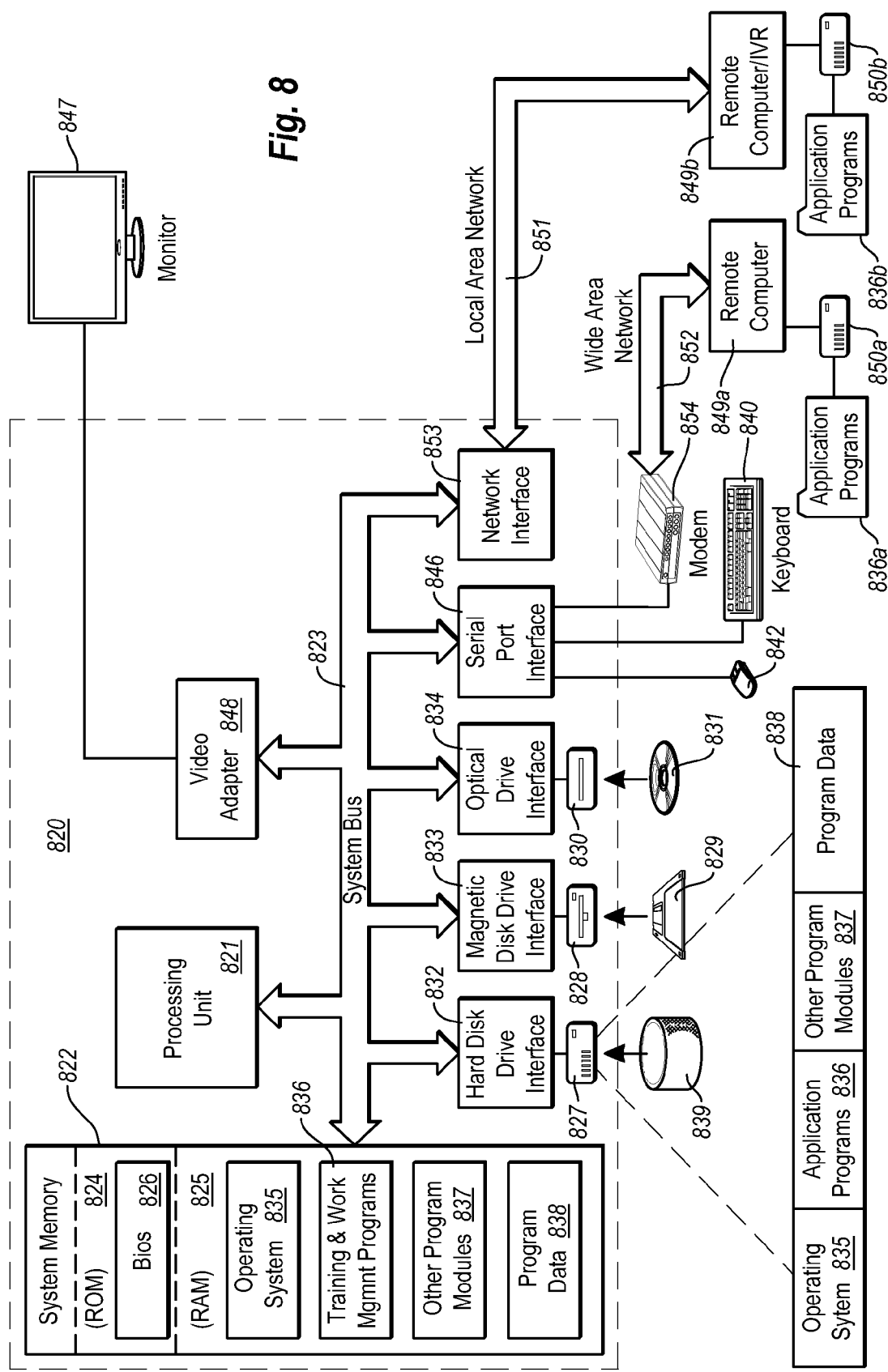
FIG. 8 provides a brief, general description of a suitable computing environment in which several embodiments may be implemented.

FIG. 8 and the following discussion are intended to provide a brief, general description of a suitable computing environment in which several embodiments may be implemented. For example FIG. 8 may illustrate an example of various components of a docketing server, a user device, a controller, or a memory device. FIG. 8 can also illustrate a means and steps for accomplishing various functionality and acts disclosed herein. For example, FIG. 8 as a specially programmed computer can read a file name of at least one file, extract a reference identifier from the file name, link a file with an intellectual asset record, extract a document code from a file name, store a document type and a document description associated with a document code, extract a document date from a file name, create a task from a task template, create a prosecution item from a prosecution template and scan a memory device for the file having a file name of a predetermined format as well as other acts and algorithms disclosed herein. Although not required, several embodiments will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps disclosed herein.

Those skilled in the art will appreciate that the embodiments illustrated herein may be practiced in network computing environments with many types of computer system configurations, including personal computers, hand-held devices, multi-processor systems, microprocessor-based or programmable consumer electronics, network PCs, minicomputers, mainframe computers, and the like. Several embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 8, an example of a docketing system for implementing several embodiments is illustrated, which includes a general purpose computing device in the form of a conventional computer 820, including a processing unit 821, a system memory 822, and a system bus 823 that couples various system components including the system memory 822 to the processing unit 821. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824. Such components, or similar components, may also embody a workstation for a company representative.

The computer 820 may also include a magnetic hard disk drive 827 for reading from and writing to a magnetic hard disk 839, a magnetic disk drive 828 for reading from or writing to a removable magnetic disk 829, and an optical disk drive 830 for reading from or writing to removable optical disk 831 such as a CD-ROM, DVD, or other optical media. The magnetic hard disk drive 827, magnetic disk drive 828, and optical disk drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the environment described herein employs a magnetic hard disk 839, a removable magnetic disk 829 and a removable optical disk 831, other types of computer readable media for storing data can be used, including magnetic cassettes, flash memory cards, digital versatile disks, Bernoulli cartridges, RAMs, ROMs, millipede memory, and the like.

Program code means comprising one or more program modules may be stored on the hard disk 839, magnetic disk 829, optical disk 831, ROM 824 or RAM 825, including an operating system 835, one or more training and work management programs 836, other program modules 837, and program data 838, such as company representative proficiencies and status. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port, or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849a and 849b. Remote computers 849a and 849b may each be another personal computer, a server, a router, a network PC, workstations of company representatives, a peer device or other common network node, and typically include many or all of the elements described above relative to the computer 820, although only memory storage devices 850a and 850b and their associated application programs 836a and 836b have been illustrated in FIG. 8. The logical connections depicted in FIG. 8 include a LAN 851 and a WAN 852 that are presented here by way of example and not limitation. Such networking environments are commonplace in office-wide or enterprise-wide computer networks, intranets and the internet.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 for real-time training, routing of work, and adjustment of incentives.

The previously described versions of the present invention have many advantages, including simplifying intellectual asset docketing and document association, providing for processing documents in bulk, scheduled batch execution, and automatic docketing task and prosecution item creation. The present invention does not require that all the advantageous features and all the advantages need to be incorporated into every embodiment of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
automatically associating, by a controller of a docketing server, a file with an intellectual asset record, the associating comprising:
reading, from one or more memory devices, metadata of a file and a file name of the file that includes a predetermined format including a reference identifier;
extracting, by the controller, the reference identifier from the file name;
determining, by the controller, whether the reference identifier matches the unique record identifier of a particular intellectual asset record of a plurality of intellectual asset records that are stored on the one or more memory devices;
in response to the reference identifier not matching the unique record identifier of a particular intellectual asset record of the plurality of intellectual asset records, storing, by the controller, an error message in the one or more memory devices;
in response to the reference identifier matching the unique record identifier of the particular intellectual asset record, linking, by the controller, the file with the particular intellectual asset record, wherein the particular intellectual asset record includes a set of related data organized into meaningful units pertaining to an intellectual asset;
determining, by the controller, whether the metadata includes a defined condition configured to trigger performance of one or more defined actions; and
in response to the metadata including the defined condition, performing, by the controller, a defined action based on the defined condition; and
once the file is associated with the intellectual asset record, defining, by the controller, one or more details of the file according to the read metadata.

2. The method of claim 1, wherein the file name includes a document date, the method further comprising:
extracting the document date from the file name, and
storing the document date as the document date value of the file once associated with the intellectual asset record.

3. The method of claim 2, wherein the file name includes a document code reference that refers to a document code item, the method further comprising:
extracting the document code reference;
determining whether the document code item includes one or more of a document description and a document type;
in response to the document code item including the document description, storing the document description as a document description value of the file once associated with the intellectual asset record;
in response to the document code item including the document type, storing the document type as a document type value of the file once associated with the intellectual asset record;
determining whether a match exists between the document code item and one or more of a task template and a prosecution template based on a correspondency between the document code item and a document upload code included in the task template and/or the prosecution template;
in response to the match existing between the document code item and document upload code of the task template, creating in the particular intellectual asset record a task according to the task template, the task denoting an action for a docketing user to complete associated with the file; and
in response to the match existing between the document code item and document upload code of the prosecution template, creating in the particular intellectual asset record a prosecution item according to the prosecution template, the prosecution item denoting an action for a docketing user to complete associated that is associated with the file.

4. The method of claim 3, wherein the prosecution item includes a signal indicating that following the completion of the prosecution item, a second prosecution item denoting a second action for a docketing user to compete is required.

5. The method of claim 3, further comprising:
in response to the document code item including the document type further displaying in a document details list UI object the document date value and the document type value;
in response to the document code item including the document description, further displaying in a document details list UI object the document date value and the document description value;
in response to the match existing between the document code item and document upload code of the task template, further displaying in a task list UI object the task, a due date based on the document date value and action date information from the task template, and a task primary target from the task template; and
in response to the match existing between the document code item and document upload code of the prosecution template, displaying in a prosecution item creation user interface (UI) object the document date value as a base/mailing date, an action due date based on the document date value and an action offset from the prosecution template, and a primary target based on a primary target from the prosecution template.

6. The method of claim 1, wherein the defined action performed is dictated by a set of rules that is configured to be modified based on a particular defined condition.

7. The method of claim 1, wherein the intellectual asset is an issued patent or pending patent application and the particular intellectual asset record is the set of related data organized into meaningful units which pertain to the issued patent or pending patent application.

8. The method of claim 1, wherein the intellectual asset is an issued trademark or pending trademark application and the particular intellectual asset record is the set of related data organized into meaningful units which pertain to the issued trademark or pending trademark application.

9. The method of claim 1, wherein the file is included in a set of files stored in a memory device, the method further comprising:
scanning the set of files stored in the memory device; and
identifying the file based on the file name being in the predetermined format.

10. The method of claim 9, wherein scanning the memory device is triggered as a scheduled process on a docketing server, wherein the docketing server includes a controller, a microprocessor, a memory device and is configured to communicate with a docketing user.

11. The method of claim 1, wherein the file includes one file of a plurality of files that are organized and stored in a file folder, the method further comprising:
receiving configuration information effective to select for a particular subset of files of the plurality of files;

determining whether each of the plurality of files meets the configuration information; and in response to a particular file of the plurality of files not meeting the configuration information, skipping the particular file.

12. The method of claim 11, wherein:
the configuration information includes a selection of a subset of the plurality of folders and a predefined schedule at which files stored in the subset are scanned.

13. A docketing server comprising:
one or more memory devices on which files and intellectual asset records are stored;
one or more controllers operatively connected to the one or more memory devices and configured to communicate with a docketing user; and
a non-transitory computer readable medium having encoded thereon computer-executable instructions which, when executed by the one or more controllers, cause performance of operations comprising:
    automatically associating a file with one of the intellectual asset records that is stored on one or more memory devices, the associating including:
        reading metadata of a file and a file name having a predetermined format including a reference identifier;
        extracting the reference identifier from the file name;
        determining whether the reference identifier matches the unique record identifier of a particular intellectual asset record of a plurality of intellectual asset records;
        in response to the reference identifier not matching the unique record identifier of a particular intellectual asset record of the plurality of intellectual asset records, storing an error message in a memory device;
        in response to the reference identifier matching the unique record identifier of the particular intellectual asset record, linking the file with the particular intellectual asset record, wherein the particular intellectual asset record includes a set of related data organized into meaningful units pertaining to an intellectual asset;
        determining whether the metadata includes a defined condition configured to trigger performance of one or more defined actions; and
        in response to the metadata including the defined condition, performing a defined action based on the defined condition; and
    once the file is associated with the intellectual asset record, defining one or more details of the file according to the read metadata.

14. The docketing server of claim 13, wherein the docketing server includes a first memory device and a second memory device, wherein the first memory device is separate from the second memory device and one of the first memory device, the second memory device, or the controller is located remotely.

15. The docketing server of claim 14, wherein the file is stored on the first memory device and the particular intellectual asset record is stored on the second memory device.

16. The docketing server of claim 13, wherein:
the file name includes a document date; and
the operations further comprise:
    extracting the document date from the file name, and
    storing the document date as the document date value of the file once associated with the intellectual asset record.

17. The docketing server of claim 16, wherein:
the file name includes a document code reference that refers to a document code item; and
the operations further comprise:
    extracting the document code reference;
    determining whether the document code item includes one or more of a document description and a document type;
    in response to the document code item including the document description, storing the document description as a document description value of the file once associated with the intellectual asset record;
    in response to the document code item including the document type, storing the document type as a document type value of the file once associated with the intellectual asset record;
    determining whether a match exists between the document code item and one or more of a task template and a prosecution template based on a correspondency between the document code item and a document upload code included in the task template and/or the prosecution template;
    in response to the match existing between the document code item and document upload code of the task template, creating in the particular intellectual asset record a task according to the task template, the task denoting an action for a docketing user to complete associated with the file; and
    in response to the match existing between the document code item and document upload code of the prosecution template, creating in the particular intellectual asset record a prosecution item according to the prosecution template, the prosecution item denoting an action for a docketing user to complete associated that is associated with the file.

18. The docketing server of claim 17, wherein the prosecution item includes a signal indicating that following the completion of the prosecution item, a second prosecution item denoting a second action for a docketing user to compete is required.

19. The docketing server of claim 17, wherein the operations further comprise:
in response to the document code item including the document type further displaying in a document details list UI object the document date value and the document type value;
in response to the document code item including the document description, further displaying in a document details list UI object the document date value and the document description value;
in response to the match existing between the document code item and document upload code of the task template, further displaying in a task list UI object the task, a due date based on the document date value and action date information from the task template, and a task primary target from the task template; and
in response to the match existing between the document code item and document upload code of the prosecution template, displaying in a prosecution item creation user interface (UI) object the document date value as a base/mailing date, an action due date based on the document date value and an action offset from the prosecution template, and a primary target based on a primary target from the prosecution template.

20. The docketing server of claim 13, wherein the defined action performed is dictated by a set of rules that is configured to be modified based on a particular defined condition.

21. The docketing server of claim 13, wherein:
the intellectual asset is an issued patent or pending patent application and the particular intellectual asset record is the set of related data organized into meaningful units which pertain to the issued patent or pending patent application; or
the intellectual asset is an issued trademark or pending trademark application and the particular intellectual asset record is the set of related data organized into meaningful units which pertain to the issued trademark or pending trademark application.

22. The docketing server of claim 13, wherein:
the file is included in a set of files stored in a memory device; and
   the operations further comprise:
      scanning the set of files stored in the memory device; and
      identifying the file based on the file name being in the predetermined format,
      wherein scanning the memory device is triggered as a scheduled process on a docketing server, wherein the docketing server includes a controller, a microprocessor, a memory device and is configured to communicate with a docketing user.

\* \* \* \* \*

UNITED STATES PATENT AND TRADEMARK OFFICE
CERTIFICATE OF CORRECTION

| | | |
|---|---|---|
| PATENT NO. | : 9,082,107 B2 | Page 1 of 1 |
| APPLICATION NO. | : 13/280219 | |
| DATED | : July 14, 2015 | |
| INVENTOR(S) | : Cheung et al. | |

It is certified that error appears in the above-identified patent and that said Letters Patent is hereby corrected as shown below:

In the specification

Column 3, Line 8, delete "illustrates example" and insert -- illustrates an example --, therefor.

Column 14, Line 34, delete "reference 530" and insert -- reference 630 --, therefor.

Signed and Sealed this
Third Day of May, 2016

Michelle K. Lee
*Director of the United States Patent and Trademark Office*